F. J. WOLFF.
BAKER'S MACHINERY.
APPLICATION FILED JAN. 14, 1919.
1,319,370.
Patented Oct. 21, 1919.
2 SHEETS—SHEET 1.
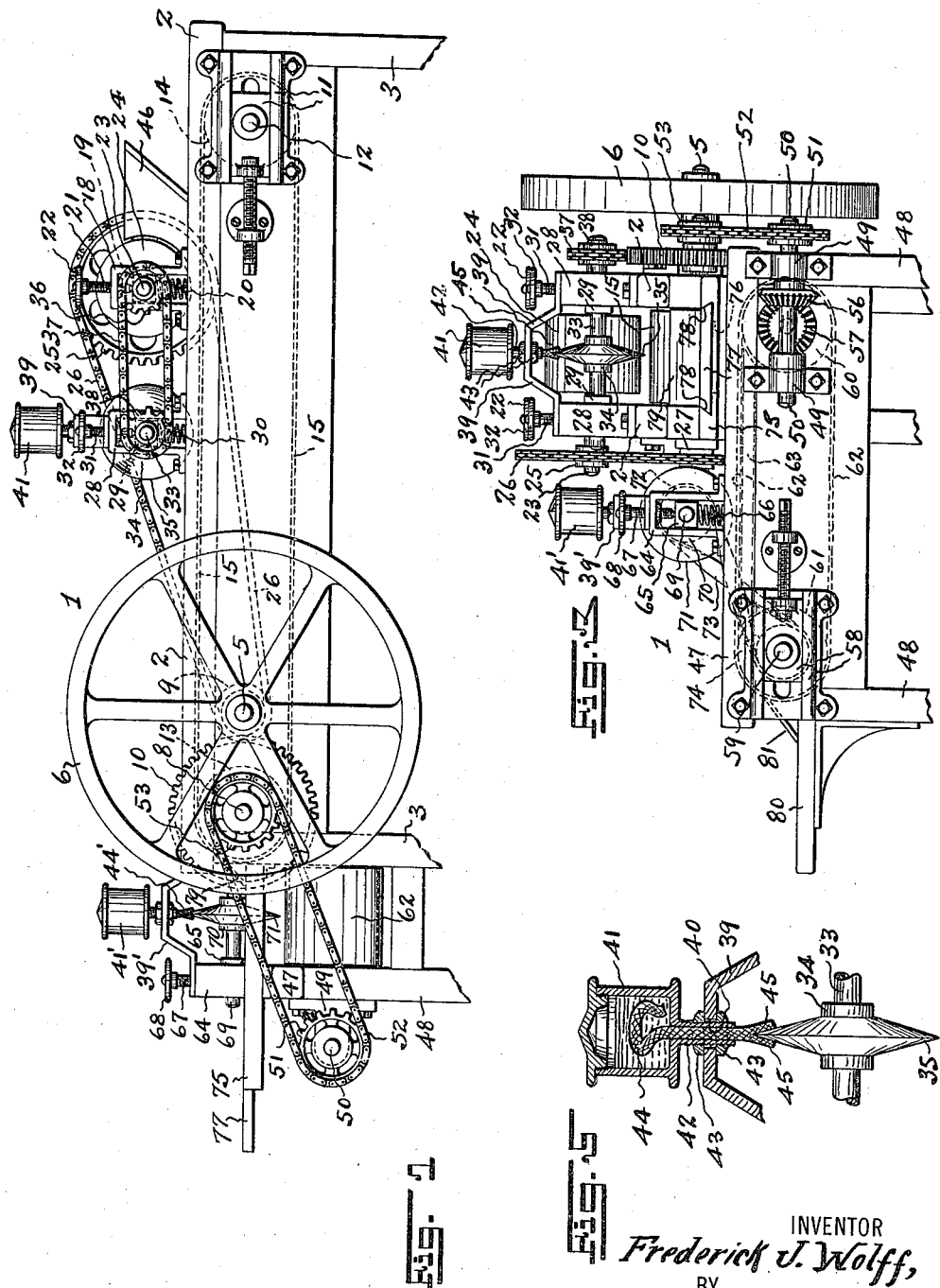
INVENTOR
Frederick J. Wolff,
BY
Fraentzel and Richards
ATTORNEYS F. J. WOLFF.
BAKER'S MACHINERY.
APPLICATION FILED JAN. 14, 1919.
1,319,370.
Patented Oct. 21, 1919.
2 SHEETS—SHEET 2.
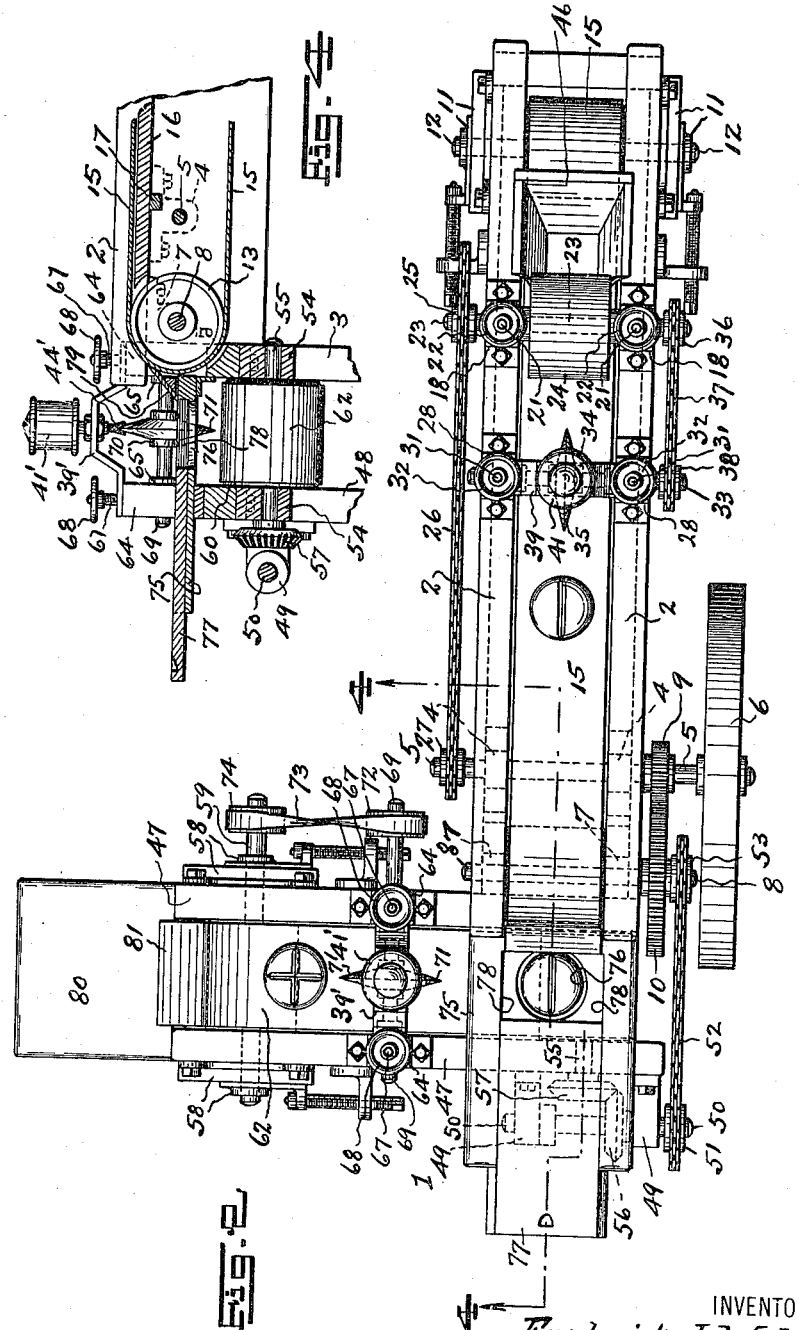
INVENTOR
Frederick J. Wolff,
BY
Fraentzel and Richards
ATTORNEYS

UNITED STATES PATENT OFFICE.

FREDERICK J. WOLFF, OF BELLEVILLE, NEW JERSEY.

BAKER'S MACHINERY.

1,319,370.  Specification of Letters Patent.  Patented Oct. 21, 1919.

Application filed January 14, 1919. Serial No. 271,142.

*To all whom it may concern:*

Be it known that I, FREDERICK J. WOLFF, a citizen of the United States, residing at Belleville, in the county of Essex and State of New Jersey, have invented certain new and useful Improvements in Bakers' Machinery; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

The present invention relates, generally, to improvements in bakery machinery; and the invention has reference, more particularly, to a simple, cheap and easily operated dough molding machine for slotting or notching roll or bun dough to produce either the longitudinal or cross notched or slotted conformation desired in the finished product.

The invention has for its principal object to provide a machine of the character above mentioned which will receive lumps or balls of dough, and thereupon automatically form and notch or slot the same to the desired shape and then deliver the same ready to be placed in the baking pans for deposit within an oven for baking.

Other objects of the present invention, not at this time more particularly enumerated, will be clearly understood from the following detailed description of the same.

With the various objects of the present invention in view, the same consists, primarily, in the novel construction of roll or bun forming machine hereinafter set forth; and the invention consists, furthermore, in the novel arrangements and combinations of the various devices and parts, as well as in the details of the construction of the same, all of which will be hereinafter more fully described, and then finally embodied in the claims appended to this specification.

The invention is clearly illustrated in the accompanying drawings, in which:—

Figure 1 is a side elevation of the novel roll or bun molding and forming machine made according to and embodying the principles of my present invention; Fig. 2 is a plan or top view of the same; Fig. 3 is an end elevation of the same looking toward the right; Fig. 4 is a detail longitudinal section, taken on line 4—4 in said Fig. 2; and Fig. 5 is a detail vertical cross section of a novel greasing means for applying a suitable grease or vegetable oil to the periphery of the notching or slotting rolls.

Similar characters of reference are employed in all of the hereinabove described views, to indicate corresponding parts.

Referring now to said drawings, the reference-character 1 indicates the complete machine comprising a supporting frame-work consisting of longitudinally extending side rails 2 spaced laterally apart, and supported by suitable legs or standards 3. Connected with said side rails 2, adjacent to one end of said frame-work, are bearings 4 in which is journaled a transverse driving shaft 5, fixed upon one end of which is a belt or driving pulley 6. Secured to said side rails 2 are additional bearings 7 in which is journaled a conveyer drive shaft 8. Fixed upon said driving shaft 5 is a driver gear 9 which meshes with a driven gear 10 fixed on said conveyer drive shaft 8, whereby power is transmitted from said driving shaft to said conveyer drive shaft.

Secured upon said frame-work, at the opposite end thereof are adjustable bearings 11 in which is journaled an idler conveyer shaft 12. Fixed upon said conveyer drive shaft 8 is a roller 13, and fixed upon the longitudinally opposite idler conveyer shaft 12 is a roller 14. Riding over said respective rollers 13 and 14 is a longitudinally disposed endless conveyer belt 15 which is driven by the roller 13, and which may be tightened or adjusted by movement of the adjustable bearings 11. As thus arranged the conveyer belt 15 rides between the side rails 2 and the upper surface of the belt is maintained against undue sagging out of normal horizontal plane by means of a backing board 16 placed beneath the same so as to extend longitudinally between the rollers 13 and 14 intermediate the side rails 2, the same being supported in connection with said side rails 2 by means of transverse carrying rods 17.

Connected with and situated upon the upper surfaces of said side rails 2 are transversely opposite vertical bearing-frames 18, in which are arranged vertically adjustable bearing blocks 19. Interposed between the bottom of said bearing blocks 19 and the bottom of said bearing-frames 18 are compression springs 20 which exert through their tension an upward pressure upon said bearing blocks 19, tending to move the latter upwardly in said bearing frames 18. Arranged in threaded connection with the upper end of each bearing-frame is a vertically movable adjusting screw 21, the lower free end of which engages and determines the vertically adjusted position of said bearing-blocks in said bearing-frames. The upper free end of each adjusting screw 21 is provided with a hand-wheel 22 for manipulating the same. Journaled in and extending between said bearing-blocks 19 is a shaft 23 upon which is fixed a molding roll 24, which is positioned above the receiving end of said conveyer belt, in properly spaced relation therefrom. Connected with one end of said shaft 23 is a sprocket wheel 25, over which runs a driving chain 26, the latter running over and being driven by a sprocket wheel 27 secured upon one end of said main driving shaft 5.

Connected with and situated upon the upper surface of said side rails 2, in a position slightly beyond the molding roll 24 above described, is another pair of transversely opposite vertical bearing-frames 28, in which are arranged vertically adjustable bearing-blocks 29. Interposed between the bottom of said bearing-frames and said bearing blocks are compression springs 30, which exert through their tension an upward pressure upon said bearing-blocks, tending to move the latter upwardly in said bearing frames. Arranged in threaded connection with the upper end of each bearing-frame 28 is a vertically movable adjusting screw 31, the lower free end of which engages and determines the vertically adjusted position of said bearing blocks 29 in said bearing-frames 28. The upper free end of each adjusting screw is provided with a hand-wheel 32 for manipulating the same. Journaled in and extending between said bearing-blocks 29 is a shaft 33 upon which is fixed a slotter or notching roll 34, having a V-shaped perimeter 35, the same being positioned above the conveyer belt in properly spaced relation thereto. Connected with the opposite end of said molding roll shaft 23 is a sprocket-wheel 36 which drives a chain 37 running over a similar sprocket-wheel 38 fixed upon said slotter or notching roll shaft 33, whereby the rotary movement transmitted to said molding roll 24 is likewise transmitted to said slotter or notching roll 34.

Supported upon the upper ends of said bearing-frames 28, so as to bridge across from one to the other, thus extending laterally above the slotter or notching roll 34, is a bridge-frame 39 provided with a centrally disposed opening 40 in the body thereof. The reference character 41 indicates a suitable reservoir or oil cup provided with a downwardly extending neck 42 which is passed through said opening 40. Said neck 42 is externally threaded to receive fastening nuts 43 whereby the neck is secured in supported relation to the bridge-frame 39. A suitable wicking 44 is submerged in the oily contents of said reservoir or cup, and one end of the same passed downwardly through said neck, so as to project exteriorly from the lower end of the latter. The lower exterior end of said wicking is bifurcated as at 45 so as to straddle the periphery of said slotter or notching roll 34. The said wicking thus maintained in contact with the periphery of the slotter or notching roll 34, feeds down a sufficient quantity of the oily content of the reservoir or cup to maintain the periphery of the slotter or notching roll thoroughly greased at all times during operation, so that there is no tendency of the dough operated upon by the slotter or notching roll sticking to the latter, or caking upon the periphery of the same, whereby the operative functions of the same would be impaired.

Secured to said side rails 2 above the conveyer belt 15, and forward of said molding roll is a hopper 46 beneath the open bottom of which said conveyer belt runs. Said hopper serves to receive the dough balls and then guide the same to proper position on the conveyer belt to assure the proper engagement of the molding roll and slotter or notching roll therewith, as the same are carried forward by the conveyer belt.

The frame work of the machine is extended laterally from a point adjacent to the discharge end of said conveyer belt 15, by means of laterally extending rails 47 spaced apart, and positioned in a plane slightly below the level of said conveyer belt 15, said rails 47 being suitably supported by legs or standards 48. Journaled in bearings 49 on the outer side of the lateral extension of said frame work thus provided is a counter shaft 50, having on its outer end a sprocket wheel 51 over which runs a driving chain 52 driven from a sprocket wheel 53 fixed on an end of said conveyer drive shaft 8, whereby rotary motion transmitted to the latter by the main driving shaft 5 and interconnected transmission is likewise simultaneously transmitted to said counter shaft 50. Journaled in bearings 54 fixed to said rails 47 is a second conveyer drive shaft 55. Fixed upon said counter shaft 50 is a miter gear 56 which meshes in driving relation with a miter gear 57 fixed on an adjacent end of said second conveyer drive shaft 55.

Secured upon said lateral extension of the frame work, adjacent to its far end, are adjustable bearings 58 in which is journaled a second idler conveyer shaft 59. Fixed upon said second conveyer drive shaft 55 is a roller 60, and fixed upon said second idler conveyer shaft is a roller 61. Riding over said respective rollers 60 and 61 is a transversely extending endless conveyer belt 62, which is driven by the roller 60, and which may be tightened or adjusted by movement of the adjustable bearings 58. As thus arranged the transverse conveyer belt 62 is positioned with its receiving end adjacent to the discharge end of the longitudinal conveyer belt 15, and in a horizontal plane spaced below the plane of the latter. The transverse conveyer belt is also maintained against undue sagging by means of a backing board 63.

Connected with and situated upon the upper surface of said rails 47 beyond the receiving end of said transverse conveyer belt 62 is a pair of opposite vertical bearing-frames 64, in which are arranged vertically adjustable bearing-blocks 65. Interposed between the bottom of said bearing-frames and said bearing-blocks are compression springs 66 which exert through their tension an upward pressure upon the bearing-blocks, tending to move the latter upwardly in said bearing-frames. Arranged in threaded connection with the upper end of each bearing-frame 64 is a vertically movable adjusting screw 67 which engages and determines the vertically adjusted position of said bearing-blocks in said bearing-frames, said screws having manipulating hand-wheels 68 at their upper ends. Journaled in and extending between said bearing-blocks 65 is a shaft 69 upon which is fixed a transverse slotter or notching roll 70, having a V-shaped perimeter 71, the same being positioned above said transverse conveyer belt in properly spaced relation thereto. Secured upon an outwardly projecting end of said shaft 69 is a pulley 72 over which runs a crossed driving belt 73 driven by a pulley 74 fixed upon an outwardly projecting end of said second idler conveyer shaft 59, whereby rotary movement in a proper direction, is transmitted to said transverse slotter or notching roll 70. Connected with the bearing frames 64 is a bridge-frame 39' supporting a reservoir or oil cup 41' from which depends a wicking 44' in wiping relation to the perimeter of the transverse slotter or notching roll to maintain the same thoroughly greased during operation, for the purposes already above indicated.

Connected with the frame-work so as to be located adjacent to the discharge end of the longitudinal conveyer belt 15, and to extend above the receiving end of the transverse conveyer belt 62 is a receiving platform 75 provided with a hatch or opening 76, which may be closed, when desired by a cover member 77 which is slidable in undercut guide ways 78 provided in the body of said platform 75. A scraper member 79 is arranged to coöperate with the discharge end of said longitudinal conveyer belt 15 to assure the removal of the dough forms therefrom, and the proper deposit of the same through the hatch 76, or if the latter is closed, upon the platform 75.

Connected with said lateral extension of the frame-work, adjacent to the discharge end of said transverse conveyer belt 62, is a receiving platform 80. A scraper member 81 is also arranged to coöperate with the discharge end of said transverse conveyer belt to assure the removal of the dough forms therefrom, and the deposit of the same upon the receiving platform 80.

In operation the machine functions and is used as follows:—

First there is successively deposited in the receiving hopper 46 lumps or balls of dough of proper size and consistency ready for forming the rolls or buns. These lumps or balls of dough, guided by the walls of the hopper, fall through its open bottom upon the surface of the moving longitudinal conveyer belt 15. The conveyer belt 15 first carries the lump or ball or dough beneath and in contact with the rotating molding roll 24 which flattens or rolls the same out into a disk like form of the required thickness. Upon emerging from beneath the molding roll the disk like form, thus produced, is carried upon the conveyer belt 15 into engagement with the slotter or notching roll 34, the V-shaped perimeter 35 of which passes across its upper surface forming the longitudinal slot or notch bounded on either side by the raised parallel cheeks. The conveyer belt 15 now carries the dough on to the discharge point, where the scraper 79 removes the dough and guides the same to the platform 75, wherein the opening 76, being uncovered by withdrawing the cover member 77, permits the dough to drop down upon the receiving end of the transverse conveyer belt 62, upon which it is carried forward beneath and in contact with the transverse slotter or notching roll 70, the V-shaped perimeter 71 of which passes transversely across the same to form a transverse or cross slot or notch intersecting the first formed slot or notch. Finally the dough thus molded and formed is discharged from the conveyer belt 62 upon the receiving platform 80, ready to be taken therefrom and placed in the baking pans for the baking process.

In the event it is not desired to cross slot or notch the dough form, the cover member 77 of the platform 75 is closed over the opening 76, so that the dough discharged from the conveyer belt 15 can not be transferred to the transverse conveyer belt 62, but remains on the platform 75, from whence it is taken and put into the baking pans.

I am aware that some changes may be made in the various arrangements and combinations of the devices and parts, as well as in the details of the construction of the same, without departing from the scope of my present invention as defined in the appended claims. Hence, I do not limit my invention to the exact arrangements and combinations of said devices and parts as set forth in the foregoing specification, nor do I confine myself to the exact details of the construction of the said parts as illustrated in the accompanying drawings:

I claim:—

1. In a device of the kind described, the combination with a supporting frame-work of a longitudinally disposed continuous conveyer means, a transversely disposed continuous conveyer means having its receiving end adjacent to and below the discharge end of said longitudinal conveyer means, a rotary notching roll having a V-shaped perimeter mounted above each conveyer means in coöperating relation thereto, a platform interposed between said discharge end of said longitudinal conveyer means and the receiving end of said transverse conveyer means, said platform having a hatch opening therein, and means connected with said platform for closing said hatch opening against the passage of dough forms from said longitudinal conveyer means to said transverse conveyer means when desired.

2. In a device of the kind described, the combination with a supporting frame-work of a longitudinally disposed continuous conveyer means, a transversely disposed continuous conveyer means having its receiving end adjacent to and below the discharge end of said longitudinal conveyer means, a rotary notching roll having a V-shaped perimeter mounted above each conveyer means in coöperating relation thereto, means for greasing the perimeters of said notching rolls, comprising a reservoir mounted above each notching roll, and a wicking leading from said reservoir with its exterior free end riding in wiping relation to the perimeter of the notching roll.

3. In a device of the kind described, the combination with a supporting frame-work of a longitudinally disposed continuous conveyer means, a transversely disposed continuous conveyer means having its receiving end adjacent to and below the discharge end of said longitudinal conveyer means, a rotary notching roll having a V-shaped perimeter mounted above each conveyer means in coöperating relation thereto, means for greasing the perimeters of said notching rolls, comprising a reservoir mounted above each notching roll, a wicking leading from said reservoir with its exterior free end riding in wiping relation to the perimeter of the notching roll, a platform interposed between said discharge end of said longitudinal conveyer means and the receiving end of said transverse conveyer means, said platform having a hatch opening therein, and means connected with said platform for closing said hatch opening against the passage of dough forms from said longitudinal conveyer means to said transverse conveyer means when desired.

4. In a device of the kind described, the combination with a supporting frame-work of a longitudinally disposed conveyer belt, a vertically adjustable molding roll mounted above the said longitudinal conveyer belt adjacent to its receiving end, a vertically adjustable notching roll having a V-shaped perimeter mounted above said longitudinal conveyer belt between said molding roll and the discharge end of said longitudinal conveyer belt, a main driving shaft, transmission mechanism driven by said driving shaft for operating said longitudinal conveyer belt, molding roll and notching roll, a transversely disposed conveyer belt having its receiving end adjacent to and below the discharge end of said longitudinal conveyer belt, a second vertically adjustable notching roll having a V-shaped perimeter mounted above said transverse conveyer belt intermediate its ends, transmission means driven by said driving shaft for operating said transverse conveyer belt and second notching roll, a platform interposed between said discharge end of said longitudinal conveyer belt and the receiving end of said transverse conveyer belt, said platform having a hatch opening therein, and means connected with said platform for closing said hatch opening against the passage of dough forms from said longitudinal conveyer belt to said transverse conveyer belt when desired.

5. In a device of the kind described, the combination with a supporting frame-work of a longitudinally disposed conveyer belt, a vertically adjustable molding roll mounted above the said longitudinal conveyer belt adjacent to its receiving end, a vertically adjustable notching roll having a V-shaped perimeter mounted above said longitudinal conveyer belt between said molding roll and the discharge end of said longitudinal conveyer belt, a main driving shaft, transmission mechanism driven by said driving shaft for operating said longitudinal conveyer belt, molding roll and notching roll, a transversely disposed conveyer belt having its receiving end adjacent to and below the discharge end of said longitudinal conveyer belt, a second vertically adjustable notching roll having a V-shaped perimeter mounted above said transverse conveyer belt intermediate its ends, transmission means driven by said driving shaft for operating said transverse conveyer belt and second notching roll, means for greasing the perimeters of said notching rolls, comprising a reservoir mounted above each notching roll, and a wicking leading from said reservoir with its exterior free end riding in wiping relation to the perimeter of the notching roll.

6. In a device of the kind described, the combination with a supporting frame-work of a longitudinally disposed conveyer belt, a vertically adjustable molding roll mounted above the said longitudinal conveyer belt adjacent to its receiving end, a vertically adjustable notching roll having a V-shaped perimeter mounted above said longitudinal conveyer belt between said molding roll and the discharge end of said longitudinal conveyer belt, a main driving shaft, transmission mechanism driven by said driving shaft for operating said longitudinal conveyer belt, molding roll and notching roll, a transversely disposed conveyer belt having its receiving end adjacent to and below the discharge end of said longitudinal conveyer belt, a second vertically adjustable notching roll having a V-shaped perimeter mounted above said transverse conveyer belt intermediate its ends, transmission means driven by said driving shaft for operating said transverse conveyer belt and second notching roll, means for greasing the perimeters of said notching rolls, comprising a reservoir mounted above each notching roll, a wicking leading from said reservoir with its exterior free end riding in wiping relation to the perimeter of the notching roll, a platform interposed between said discharge end of said longitudinal conveyer belt and the receiving end of said transverse conveyer belt, said platform having a hatch opening therein, and means connected with said platform for closing said hatch opening against the passage of dough forms from said longitudinal conveyer belt to said transversely conveyer belt when desired.

In testimony, that I claim the invention set forth above I have hereunto set my hand this 11th day of January, 1919.

FREDERICK J. WOLFF.

Witnesses:
 FREDK. C. FRAENTZEL,
 BARBARA W. SUTTERLIN.

Copies of this patent may be obtained for five cents each, by addressing the "Commissioner of Patents, Washington, D. C."